United States Patent [19]
Ikelle et al.

[11] Patent Number: 5,987,389
[45] Date of Patent: Nov. 16, 1999

[54] MULTIPLE ATTENUATION METHOD

[75] Inventors: Luc Thomas Ikelle, Milton; Dominique J. Pajot, London, both of United Kingdom

[73] Assignee: Schlumberger Technology Corporation, Ridgefield, Conn.

[21] Appl. No.: 08/864,156

[22] Filed: May 28, 1997

[30] Foreign Application Priority Data

Jun. 14, 1996 [GB] United Kingdom .................. 9612470

[51] Int. Cl.$^6$ .................................................. G06F 19/00
[52] U.S. Cl. ............................................................ 702/17
[58] Field of Search ................................. 702/5, 17, 16; 367/24, 21, 43, 46

[56] References Cited

U.S. PATENT DOCUMENTS

| | | | |
|---|---|---|---|
| 4,209,854 | 6/1980 | Ruehle ...................................... | 367/43 |
| 4,353,121 | 10/1982 | Ray et al. .................................. | 702/17 |
| 4,476,550 | 10/1984 | Ziolkowski et al. ...................... | 367/21 |
| 4,823,326 | 4/1989 | Ward ........................................ | 367/41 |
| 4,887,243 | 12/1989 | Pann ........................................ | 367/24 |
| 5,095,466 | 3/1992 | Julien et al. ............................. | 367/24 |
| 5,365,492 | 11/1994 | Dragoset, Jr. ............................. | 367/21 |
| 5,581,514 | 12/1996 | Moldoveanu et al. .................... | 367/16 |

FOREIGN PATENT DOCUMENTS

WO 95/10787   4/1995   WIPO .

OTHER PUBLICATIONS

Carvalho, F.M., and Weglein, A. B., Examples of a Nonlinear Inversion Method Based on the T Matrix of Scattering Theory: Application to Multiple Suppression, Mtg. Soc. Expl. Geophys. (1991), Expanded Abstracts, pp. 1319–1322.

A. Ziolkowski*—Geophysics, vol. 56, No. 2 (Feb. 1991); pp. 190–201, 8 Figs.

A. B. Weglein* and B. G. Secrest—Geophysics, vol. 55, No. 7 (Jul. 1990); pp. 902–913, 11 Figs.

M. Landro* and R. Sollie* Geophysics, vol. 57, No. 12 (Dec. 1992); pp. 1633–1640 11 Figs., 1 Table.

F. Araujo, A.B. Weglein, P. Carvalho, R.H. Stolt, Society of Exploration Geophysicist, International Exposition 64$^{th}$ Annual Meeting, Oct. 1994 "Inverse scattering series of multiple attenuation: An example with surface and internal multiples".

*Primary Examiner*—Donald E. McElheny, Jr.
*Attorney, Agent, or Firm*—William L. Wang; Keith G. W. Smith; William B. Batzer

[57] ABSTRACT

Methods and apparatus are described for reducing the multiple energy in seismic signal acquisitions, in particular for sea bottom acquisition. The method is based on the scattering Born series for free-surface multiples. It is characterized in that only terms of the even sub-series of the scattering Born series are considered for determining the multiple-free data.

5 Claims, 5 Drawing Sheets

MULTIPLE ATTENUATION METHOD

The present invention relates to a method of reducing the effects of multiple reflected energy. Such a method may also be used with marine seismic reflection data obtained by means of seismic sources and receivers located in water and towed behind a seismic exploration vessel, in particular for sea bottom acquisition where the receivers are located at the sea bottom. These methods may be used during actual surveying and/or subsequently with recorded data from such surveys.

BACKGROUND OF THE INVENTION

During seismic surveying, a seismic source is repeatedly actuated and seismic receivers, such as hydrophones in marine seismic surveying, receive energy direct from the sources and reflected from various boundaries or interfaces. In the case of marine seismic surveying, energy propagates into the earth and is reflected back to the hydrophones from subterranean boundaries or interfaces, for instance between strata of different types. The recorded seismic data can be processed to reveal information about the structure of the earth in the area being surveyed. However, such reflections are contaminated by other reflection paths. For instance, energy from the sources is reflected at the sea surface directly to the hydrophones. Also, energy can be reflected more than once between the sources and the receivers. Such multiple reflections can take place within the earth. Also, energy initially traveling downwards from the sources can be reflected upwardly and then downwardly again from the surface of the sea before arriving at the hydrophones. Reflections of this type are referred to as "free-surface multiple reflections". Free-surface multiple reflections can be classified according to their order, which is equal to the number of reflections from the free-surface. Thus, first order free-surface reflections comprise energy initially traveling downwardly from the sources (as opposed to "ghosting" where energy travels upwardly and is reflected from the free-surface), is reflected upwardly from the sea bed or a boundary below the sea bed, and is then reflected downwardly from the free-surface to the hydrophones. Second order free-surface multiple reflections undergo two downward reflections from the sea-surface before being detected by the hydrophones, and so on.

The invention makes use of a general concept of multiple attenuation using the inverse scattering or scattering Born series. For this general concept reference is made to the published International patent application WO 95/10787 and the British patent application No. 9426255.7 (published as GB-A-2296567).

From those documents it is known how to derive the scattering Born series for removing free surface multiples:

$$D_P = D_0 + AD_1 + A^2 D_2 + A^3 D_3 + \ldots, \quad [1]$$

wherein $D_P$ denotes the signals without free-surface multiples and $A$ denotes the inverse of the source signature. The first term of the scattering series, $D_0$, is the actual seismic data, the second term, $D_1$, removes first order free-surface multiples, the following term, $D_2$, removes second order free-surface multiples, and so forth.

It is an object of the present invention to improve and utilize the above method for sea bottom seismic acquisition operations.

SUMMARY OF THE INVENTION

The objects of the invention are achieved by methods as set forth in the appended claims.

It is regarded as an important feature of the invention that for sea bottom acquisition only a subset comprising of even terms of the scattering Born series or any mathematical equivalent formulation thereof is used. Clearly, only a finite number of terms in said series, also known as "partial sum", is used for numerical calculations.

In a variant of the invention, only the first coefficient $D_2$ of the series is calculated using the measured wave field whereas the other coefficients $D_4$, $D_6$, etc. are derived by an iterative process using a partial sum, in particular the first two terms, of the scattering series itself. In another variant, all coefficients $D_2$, $D_4$, $D_6$, etc. are first calculated from the measured wavefield and are then introduced into the scattering series.

It is an advantage that the known methods for applying the inverse scattering series and for estimating the source signature, as described in the above-mentioned references, can be used without modification.

These and other features of the invention, preferred embodiments and variants thereof, possible applications and advantages will become appreciated and understood by those skilled in the art from the detailed description and drawings following hereinafter.

DESCRIPTION OF THE PREFERRED EMBODIMENTS

Figure 1:
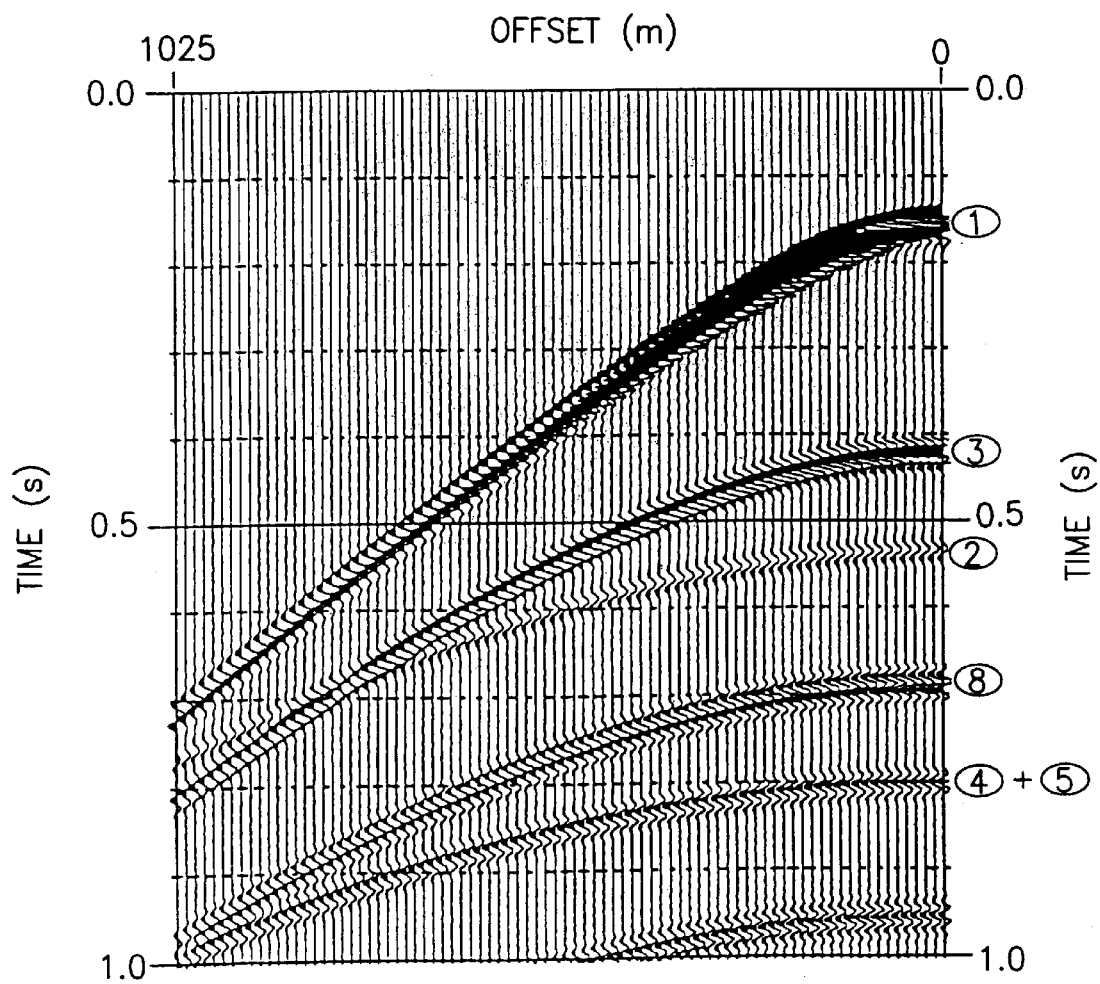
FIG. 1 shows a 1D synthetic example representing a marine survey with sea bottom receivers.

In the following the new method is applied to a synthetic data set corresponding to a surface seismic experiment with a sea bottom cable, i.e., seismic receivers positioned at sea bottom level. In FIG. 1 the generated traces are depicted in a time-offset diagram. Real and apparent seismic events are labeled (1–5, 8).

Figure 2:
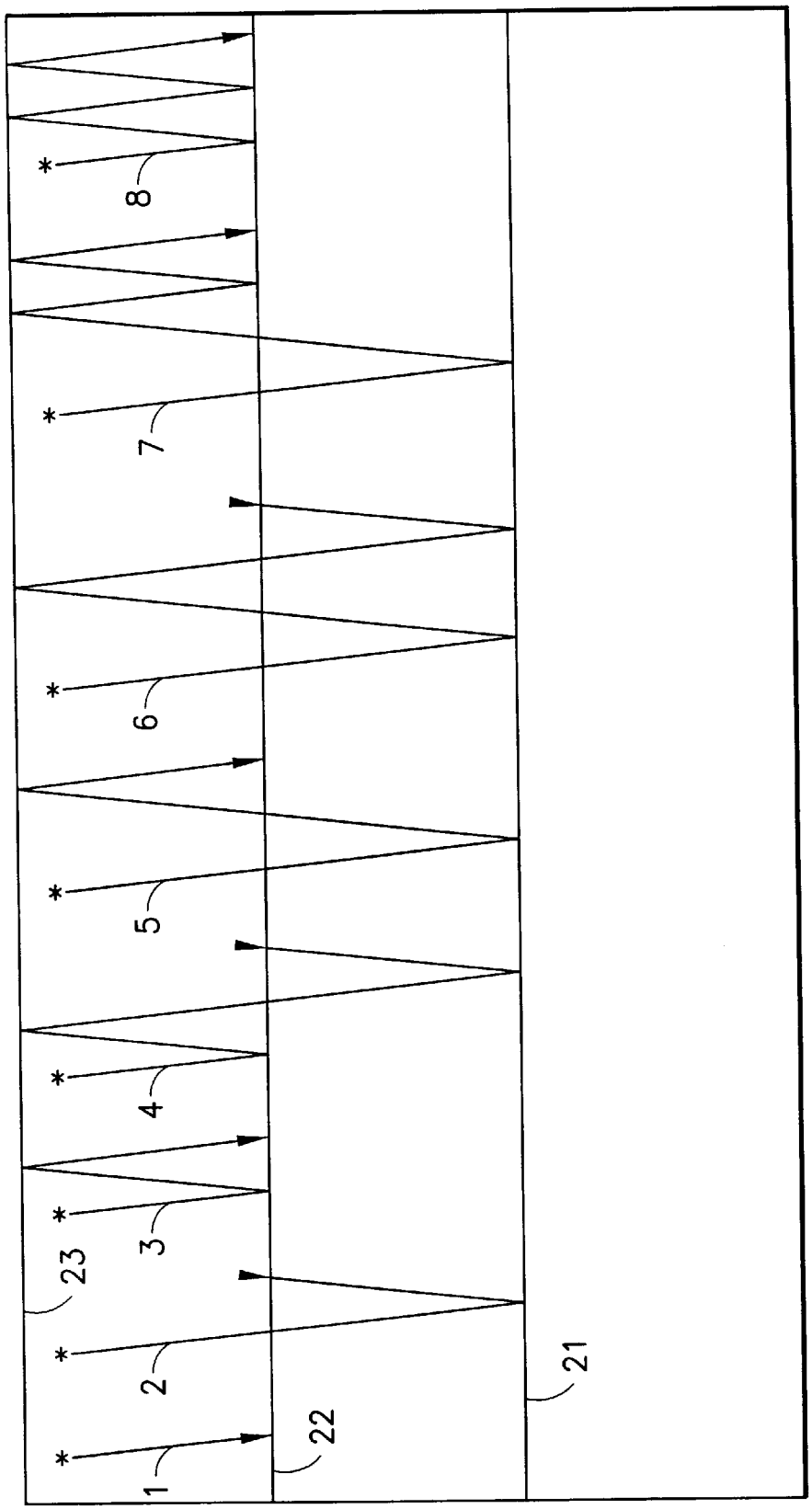
FIG. 2 illustrates the seismic events corresponding to terms of the scattering Born series.

Primary and multiple events are further illustrated in FIG. 2, which shows an earth having one reflector 21, the sea bottom 22, and the sea (free) surface 23. A number of possible travel paths for the seismic wave are illustrated, the numerals of which correspond to those of FIG. 1.

Figure 3:
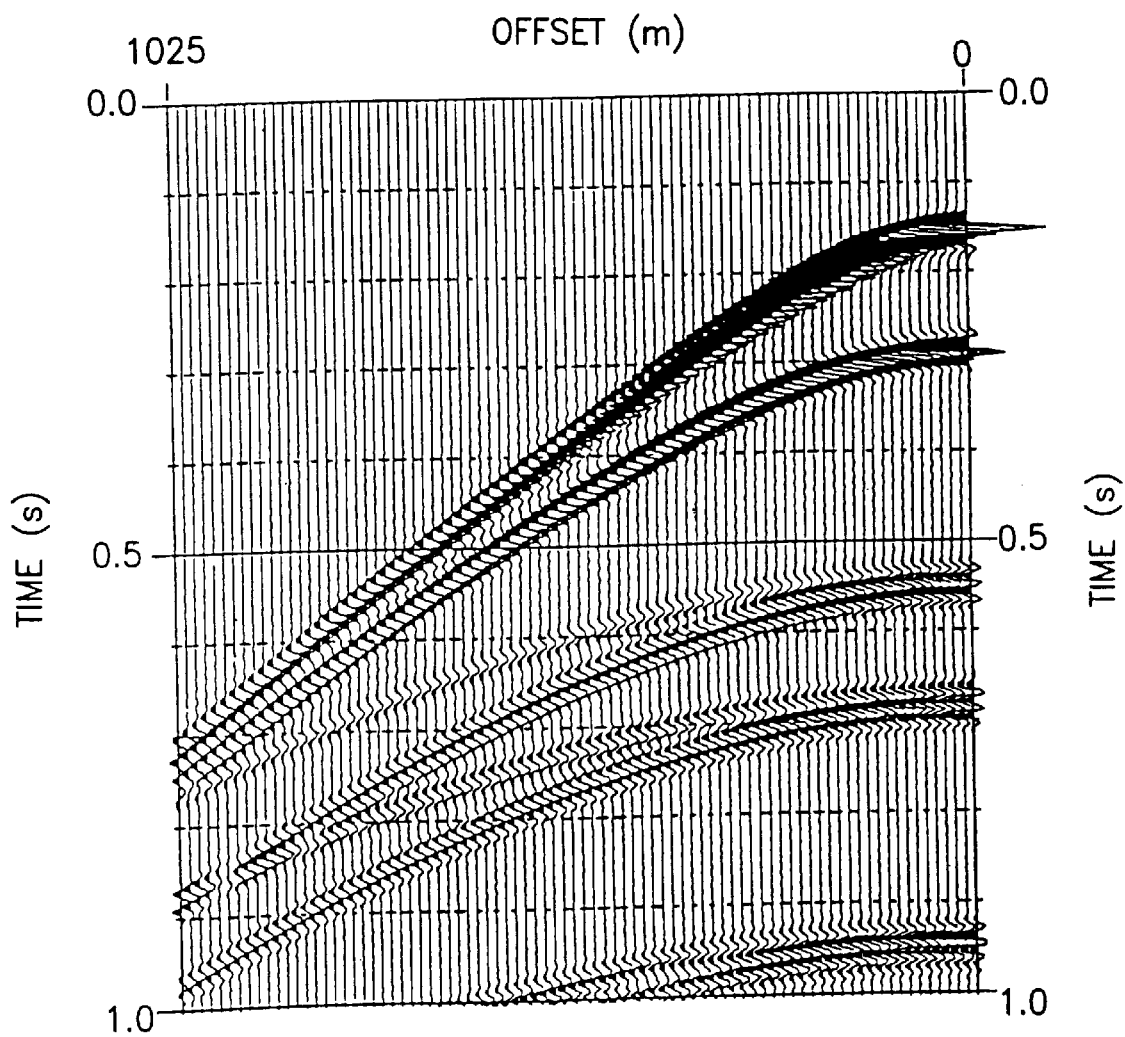
FIG. 3 shows the effect of multiple attenuation in accordance with the prior art.

Referring now to FIG. 3, the signals of FIG. 1 have been processed in accordance with the prior art method described in the British patent application No. 9426255.7 (published as GB-A-2296567) using the first four terms of the full scattering Born series:

$$D_P = D_0 + AD_1 + A^2 D_2 + A^3 D_3 \quad [2]$$

Comparing this result with the original data (FIG. 1), it is noteworthy that, though some multiples have been attenuated, new undesired are created.

Figure 4:
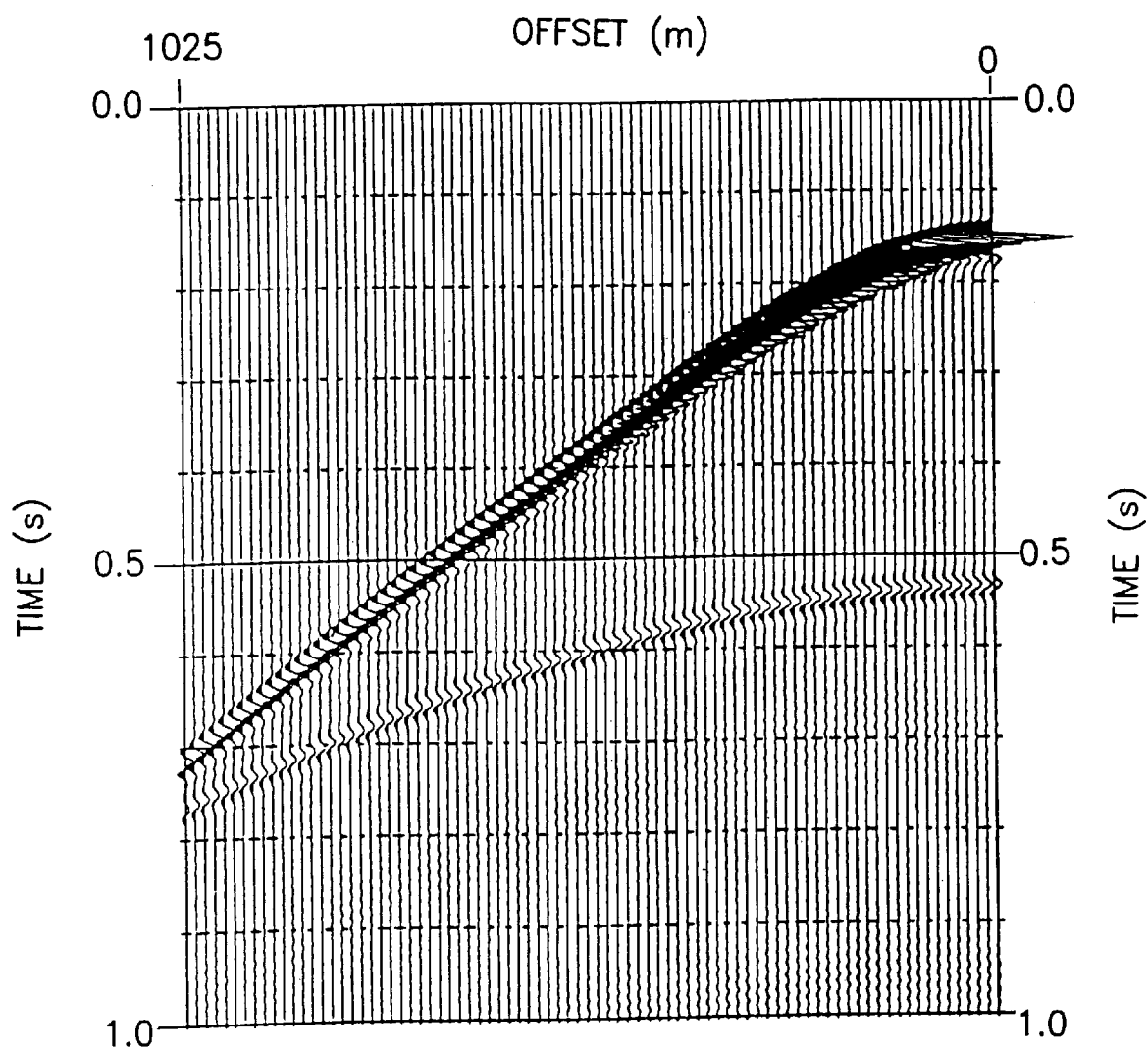
FIG. 4 shows the effect of multiple attenuation in accordance with an example of the invention.

Referring now to FIG. 4, the signals of FIG. 1 are processed using the same method as in the previous prior art example. However, in accordance with the invention, eq. [2] is replaced by the even sub-series of the scattering Born series. Again for practical purposes, only the first four terms of the series is used in the process:

$$D_P = D_0 + A^2 D_2 + A^4 D_4 + A^6 D_6 \quad [3]$$

It should be appreciated that the labels of the coefficient is arbitrary. The notation used herein however is meant to help clarifying the difference between the prior art and the present invention.

The coefficients $D_2$, $D_4$, $D_6$ are determined using the recursive relation for the coefficients of the full scattering series:

$$D_n = \frac{\omega}{c} \int_{-\infty}^{\infty} dk \cos\theta D_0 D_{n-1}, \quad [4]$$

which appears as equation no. 2 in the British patent application No. 9426255.7 (published as GB-A-2296567) and is also described by P. M. Carvalho, A. B. Weglein, R. H. Stolt in: Mtg. Soc. Expl. Geophys. (1991), Expanded Abstracts, 1319–1322. Hence the first coefficient of the new even series, $D_2$, is determined by $D_0$ and the first coefficient of the free surface scattering series, $D_1$.

It is shown that only the first arrival energy 1 and the reflected signal 2 are present in the data. All other events appear attenuated.

Once $D_2$ is determined, in a further embodiment of the invention, an iterative process can be used to determine the partial sum up to the desired number of terms. The iterative process starts with $$D_P^{(0)} = D_0 + A^2 D_2^{(0)};$$
$$D_P^{(1)} = D_0 + A^2 D_2^{(1)} = D_0 + A^2 (D_P^{(0)} + A^2 D_2^{(0)}); \ldots \quad [5]$$

It seen as an advantage of this approach that the recursive relation (eq. [4]) is used only to derive the first coefficient $D_2$.

Figure 5:
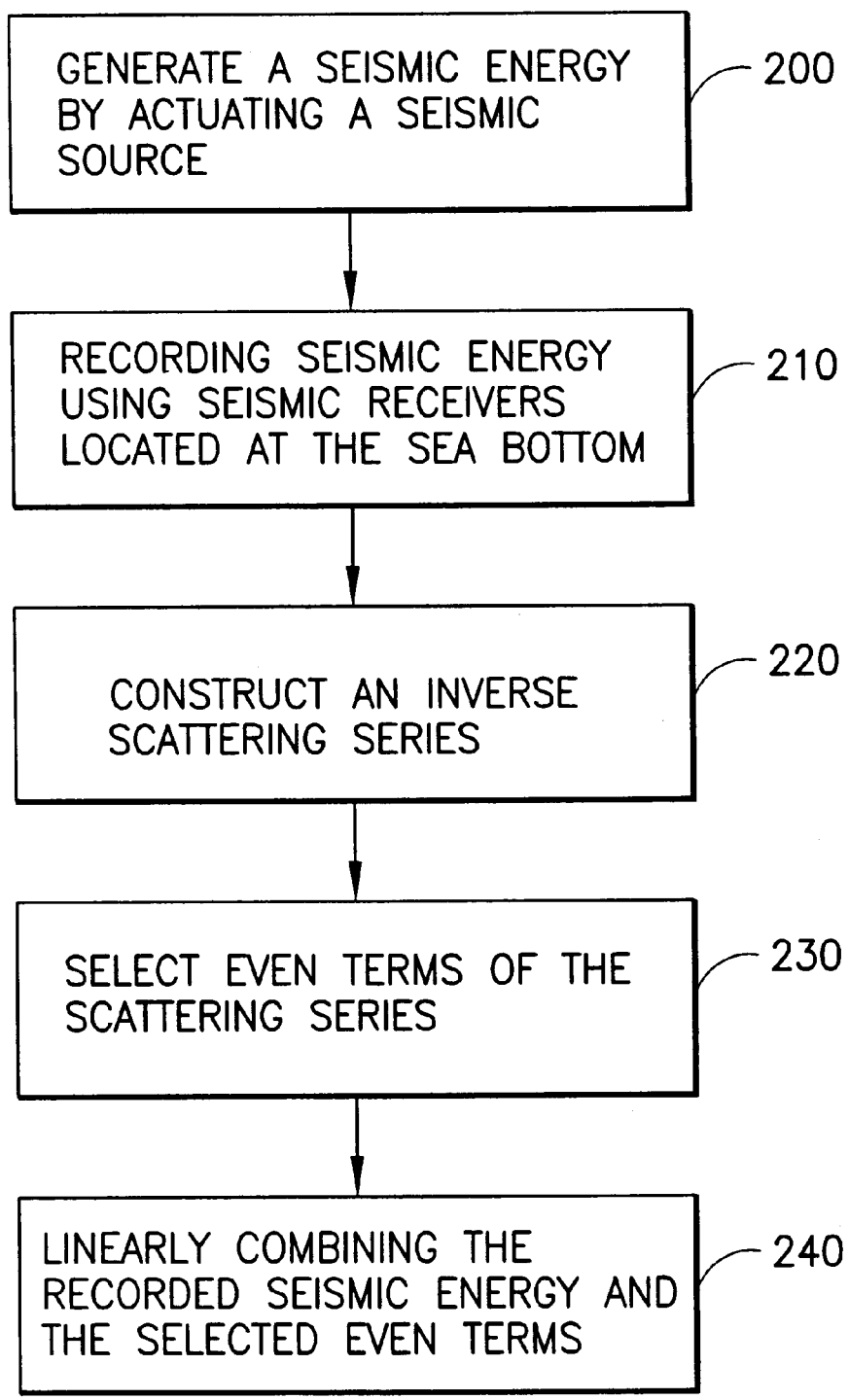
FIG. 5 illustrates steps involved in carrying out a preferred embodiment of the invention.

Referring to FIG. 5, the following steps are involved in carrying out a preferred embodiment of the invention. In step 200, seismic energy is generated by actuating a seismic source. In step 210, seismic energy is recorded using seismic receivers located at the sea bottom. In step 220, an inverse scattering series is constructed. In step 230 even terms of the scattering series are selected. In step 240, the selected even terms are linearly combined with the recorded seismic energy.

We claim:

1. A method for reducing the effects of sea surface reflections in recordings of seismic energy measured at the sea bottom comprising:

generating seismic energy in a body of water bounded by a sea bottom and a sea surface, such that the seismic energy travels through the body of water and through earth formations lying under the sea bottom;

recording the seismic energy using seismic receivers located at the sea bottom, some of the recorded seismic energy having traveled through the earth formations, and some of the recorded seismic energy having been reflected at least once from the sea surface;

constructing an inverse scattering series comprising a polynomial having at least one even term and at least one odd term and each term comprising an inverse of a signature of the generated seismic energy, the series designed to attenuate multiple reflected energy;

selecting at least one even term of the inverse scattering series; and linearly combining the recorded seismic energy with the selected at least one even term such that the seismic energy having been reflected at least once from the sea surface is attenuated.

2. The method of claim 1, wherein each of the terms of the inverse scattering series comprise a coefficient at least some of which are determined using a recursive relationship between coefficients in lower-powered terms and the recorded seismic energy.

3. The method of claim 1, wherein the step of constructing comprises using an iterative process based on a first two of the even terms.

4. The method of claim 1, wherein the recorded seismic energy comprise transformed recorded data.

5. The method of claim 1, wherein the recorded seismic energy comprise prestack seismic data.

* * * * *